3,013,031
9(11)-16-PREGNADIENE-20-ONE COMPOUNDS THROUGH 17 AND 21 BROMINATED INTERMEDIATES
Frank A. Cutler, Jr., Westfield, and John M. Chemerda, Metuchen, N.J., assignors to Merck & Co., Inc., Rahway, N.J., a corporation of New Jersey
No Drawing. Filed July 14, 1958, Ser. No. 748,178
6 Claims. (Cl. 260—397.45)

This invention relates to the preparation of new steroid compounds and to processes and intermediates employed in their preparation. More particularly it relates to the preparation of 3-hydroxy-9(11), 16-pregnadien-20-one, 3,11β-dihydroxy-16-pregnen-20-one and 3-esters thereof and the novel intermediates in the production thereof.

The novel compounds and the process of the present invention are illustratively represented by the following formulae:

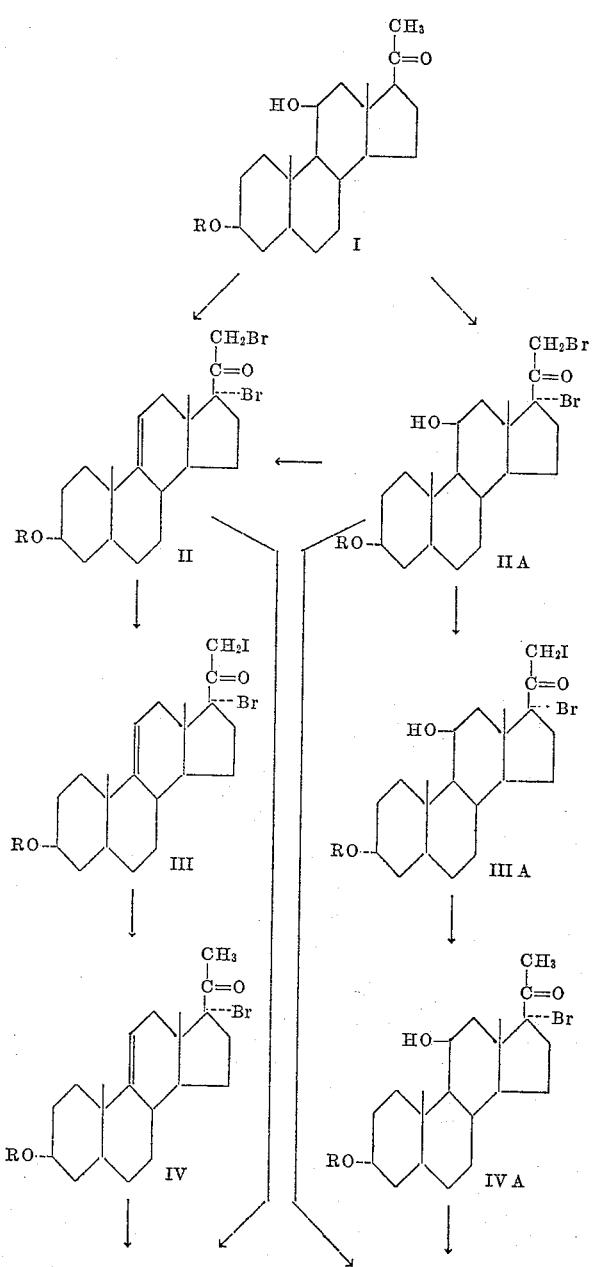

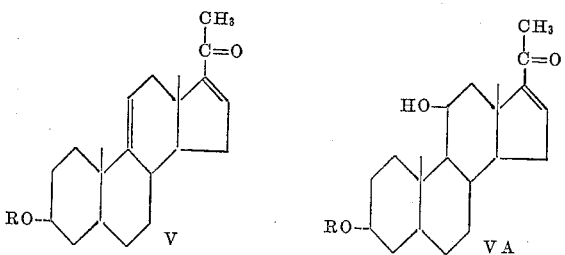

wherein R is hydrogen or the acyl radical of an aliphatic carboxylic acid, preferably one containing one to eight carbon atoms, inclusive.

It is an object of the invention to provide 3-hydroxy-9(11), 16-pregnadien-20-one, 3,11β-dihydroxy-16-pregnen-20-one and esters thereof. It is another object of the invention to provide methods for the production of the novel compounds and novel intermediates. Other objects of the invention will be apparent to those skilled in the art to which this invention pertains.

The new products, 3-hydroxy-9(11),16-pregnadien-20-one, 3,11β-dihydroxy-16-pregnen-20-one and the 3-esters thereof have utility as intermediates in the preparation of biologically active 16α-methyl steroids. More specifically these new products may be used in the preparation of 16α-methyl-9α-fluoro-11β,17α,21-trihydroxy-1,4-pregnadiene-3,20-dione and 16α-methyl-11β,17α,21-hydroxy-1,4-pregnadiene-3,20-dione. These compounds possess unusually high antiinflammatory and gluco-corticoid activity and are useful in the treatment of rheumatoid arthritis.

The compounds of the present invention may be converted to the active anti-arthritic compounds by application of the following procedure: for example 3-acetoxy-9(11), 16-pregnadien-20-one or 3-acetoxy-11β-hydroxy-16-pregnen 20-one is reacted with methyl magnesium iodide in the presence of cuprous chloride thereby forming 16α-methyl-3-acetoxy-9(11)-pregnen-20-one or 16α-methyl-3-acetoxy-11β-hydroxy-pregnan - 20 - one respectively. The 16α-methyl-3-acetoxy-9(11)-pregnen-20-one is then treated with hypobromous acid to produce 9α-bromo-16α-methyl-3-acetoxy-11-β - hydroxypregnan - 20-one which is reacted with potassium acetate in ethanol to produce 16α-methyl-9,11-oxido-3-acetoxy-pregnan-20-one. This 9,11 oxide is then reacted with hydrogen fluoride in tetrahydrofuran to produce 16α-methyl-9α-fluoro-11β-hydroxy-3-acetoxy-pregnan-20-one.

The 16α-methyl-9α-fluoro-11β-hydroxy-3-acetoxypregnan-20-one or 16α-methyl-3-acetoxy-11β-hydroxy-pregnan-20-one compounds are then treated microbiologically to introduce hydroxy substituents at positions 17 and 21 of the molecule to produce 16α-methyl-9α-fluoro-3,11β,17α,21-tetrahydroxy-pregnan-20-one or 3,11β,17α, 21-tetrahydroxy-pregnan-20-one respectively. These compounds are then subjected to a further microbiological treatment by contacting them with a growing culture of Nocardia blackwellii to oxidize the 3-hydroxy group to a 3-keto group and introduce double bonds into the A-ring of the molecule at positions 1,2 and 4,5 thereby producing 16α-methyl-9α-fluoro-11β,17α,21-trihydroxy-1,4-pregnadiene-3,20-dione and 16α-methyl-11β, 17α,21-trihydroxy-1,4-pregnadiene-3,20-dione respectively.

Thus, for example, 16α-methyl-9α-fluoro-11β-hydroxy-3-acetoxy-pregnan-20-one or 16α-methyl-3-acetoxy-11β-hydroxypregnan-20-one is treated according to the procedures described in U.S. Patent 2,831,798. Each of the above compounds is contacted successively with a growing culture of Wojnowicia graminis NRRL 2472 and Tricoderma viride NRRR 2473 to produce 16α-methyl-9α-fluoro-3,11β-17α - 21-tetrahydroxypregnan-20-one or 3,11β,17α,21 - tetrahydroxy-pregnan-20-one respectively.

These compounds are recovered from the growing cultures of the microorganisms, after sterilization, by extraction and crystallization.

The new compounds of the present invention also have utility as intermediates in the preparation of 16α-methyl-9α-fluoro-11β-hydroxy-progesterone and 16α-methyl-11β-hydroxy-progesterone, which compounds are highly active progestational agents. Thus, for example 3-acetoxy-9(11),16-pregnadien-20-one and 3-acetoxy-11β-hydroxy-16-pregnen-20-one are reacted with methyl magnesium iodide in the presence of cuprous chloride thereby forming 16α-methyl-3-acetoxy-9(11)-pregnen-20-one and 16α-methyl-3-acetoxy-11β-hydroxy-pregnan - 20 - one respectively, which are then reacted with an ethanol solution of sodium hydroxide to form 16α-methyl-3-hydroxy-9,(11)-pregnen-20-one and 16α-methyl-3,11β-dihydroxy-pregnan-20-one. The latter two compounds are reacted with chromium trioxide in pyridine thus forming the corresponding 3-keto compounds. The 3-keto compounds are contacted with equi-molar portions of bromine in acetic acid to produce the corresponding 3-keto-4-bromo compounds which are converted by heating in the presence of collidine to 16α-methyl-4,9(11)-pregnadiene-3,20-dione and 16α-methyl-11β-hydroxy-4-pregnene-3,20-dione respectively.

The 16α-methyl-4,9(11)-pregnadiene-3,20-dione is then treated with hypobromous acid to produce 9α-bromo-16α-methyl-11β-hydroxy-4-pregnene-3,20-dione which is reacted with anhydrous potassium acetate in ethanol to produce 16α - methyl - 9,11 - epoxy - 4 - pregnene - 3,20-dione. This 9,11-epoxide is then reacted with hydrogen fluoride in tetrahydrofuran to produce the biologically active 16α-methyl-9α-fluoro-11β-hydroxy-4-pregnene-3,20-dione.

The process of the present invention is concerned with converting the known 3,11β-dihydroxy-pregnan-20-one or the 3-acylate thereof into the novel intermediates 3-hydroxy - 9(11),16 - pregnadien - 20 - one,3,11β - dihydroxy-16-pregnen-20-one and the 3-acylates thereof.

Regarded in certain of its broader aspects the process comprises brominating a 3,11β-dihydroxy-pregnan-20-one or the 3 ester thereof (I) in the presence of a strong acid catalyst to obtain a 3-hydroxy-17,21-dibromo-9(11)-pregnen-20-one or a 3 ester thereof (II); contacting the thus obtained 3-hydroxy-17,21-dibromo-9(11)-pregnen-20-one or 3-ester thereof (II) with an alkali metal iodide to replace the 21-bromo substituent with iodine thereby forming the 3-hydroxy-17-bromo-21-iodo-9(11)-pregnen-20-one or 3 ester thereof (III); subjecting said 3-hydroxy-17-bromo-21-iodo-9(11) pregnene or 3-ester thereof (III) to reaction conditions effective in replacing iodine with hydrogen thereby forming a 3-hydroxy-17-bromo-9(11)-pregnen-20-one or 3-ester thereof (IV) and contacting said 3-hydroxy-17-bromo-9(11)-pregnen-20-one or 3-ester thereof (IV) with a dehydrohalogenating agent to obtain the 3-hydroxy-9(11),16-pregnadien-20-one or a 3-ester thereof (V).

Alternatively the process comprises brominating the known 3,11β-dihydroxypregnan-20-one or 3-ester (I) thereof at low temperatures to obtain 3,11β-dihydroxy-17,21-dibromopregnan-20-one or 3-ester thereof (IIA); contacting the thus obtained 3,11β-dihydroxy-17,21-dibromopregnan-20-one or 3-ester thereof (IIA) with an alkali metal iodide to replace the 21-bromo substituent with iodine thereby forming 3,11β-dihydroxy-17-bromo-21-iodopregnan-20-one or 3-ester thereof (IIIA); subjecting said 3,11β-dihydroxy-17-bromo-21-iodopregnan-20-one or 3-ester thereof (IIIA) to reaction conditions effective in replacing iodine with hydrogen thereby forming a 3,11β-dihydroxy-17-bromo-pregnan-20-one or 3-ester thereof (IVA) and contacting said 3,11β-dihydroxy-17-bromo-pregnen-20-one or 3 ester thereof (IVA) with a dehydrohalogenating agent to obtain 3,11β-dihydroxy-16-pregnen-20-one or 3-ester thereof (VA).

The bromination of the 3-oxygenated-11β-hydroxy-pregnan-20-one to produce 3-oxygenated-17-bromo-9(11)pregnen - 20 - one, 3 - oxygenated - 17,21 - dibromo-9(11)pregnen - 20 - one, 3 - oxygenated - 17 - bromo-11β-hydroxy-pregnan-20-one or 3-oxygenated-17,21-dibromo-11β-hydroxy-pregnan-20-one having in ring D the partial formula;

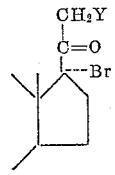

wherein Y is a substituent selected from the group consisting of hydrogen and bromine is ordinarily conducted by contacting a solution of the steroid with solution of bromine in the presence of a strong acid catalyst. Solvents for the reaction may be chlorinated hydrocarbons such as chloroform, acetic acid or mixtures of these with a lower alkanol such as methanol. The acid catalyst may be any strong non-oxidizing acid which will not degrade the steroid molecule. Acids such as hydrobromic acid, p-toluenesulfonic acid and 3,5-dinitrobenzenesulfonic acid are satisfactory for this purpose.

When the bromination is carried out at elevated temperatures ranging from 30 to 100° C. inclusive and preferably at about 40–45° C. elimination of the 11-hydroxyl group takes place with resulting formation of a 9(11) double bond. Under these elevated temperature conditions and using an equimolar ratio of 3-oxygenated-11β-hydroxy - pregnan - 20 - one; e.g. 3 - acetoxy - 11β - hydroxy-pregnan-20-one to bromine, the brominated product which is formed is largely the 3-oxygenated-17-bromo-9(11)pregnen - 20 - one; e.g. 3 - acetoxy - 17 - bromo-9(11)pregnen-20-one. When a bromine to steroid molar ratio of 2 to 1 is employed under the same conditions the corresponding 3 - oxygenated - 17,21 - dibromo - 9(11)-pregnen - 20 - one; e.g. 3-acetoxy-17,21-dibromo-9(11)-pregnen-20-one is formed.

When the bromination reaction is carried out under reaction conditions effective in preventing dehydration at position 11 the brominated 11β-hydroxy pregnane is formed. Conditions employed in effecting this conversion are carrying out the bromination at a lowered temperature in the range of about 30 to +10° C. or in the presence of a Lewis base such as methanol. Thus, when a solution of 3-oxygenated 11β-hydroxy-pregnan-20-one is contacted with a solution of bromine at a temperature of about −30° to +10° C., preferably at about 0° C. there is formed the corresponding 3-oxygenated-17,21-dibromo-11β-hydroxy-pregnan-20-one or the 3-oxygenated 17-bromo-11-β-hydroxy-pregnan-20-one.

The 3-oxygenated-17,21-dibromo-11β-hydroxy-pregnan-20-one may then be converted to the corresponding 3-oxygenated-17,21-dibromo-9(11)-pregnen-20-one by heating in the presence of a strong acid for a period of from about five minutes to one hour. The strong acid employed is conveniently any of the strong acid catalyst, mentioned above, effective in catalyzing the bromination. It is possible, although not necessarily desirable, to isolate and crystallize the 3-oxygenated-11β-hydroxy-17,21-dibromo-pregnan-20-one before carrying out the dehydration step.

The 3 - oxygenated - 17,21 - dibromo compounds, e.g. 3 - oxygenated-17,21-dibromo-9(11)-pregnen-20-one and 3 - oxygenated - 17,21 - dibromo - 11β - hydroxy-pregnan-20-one are desirably recovered before carrying out the treatment with an alkali metal iodide to replace the 21-bromo substituent with a 21-iodo substituent. The recovery may be effected by diluting the reaction mixture with an equal volume of chloroform, washing with successive portions of water, aqueous sodium bicarbonate solution, and water to remove traces of acid and removing the solvent from the steroidal product by evaporation under vacuum. The residual material after removal of the solvent may be crystallized by trituration with ether and recrystallized from a number of organic solvents including methanol, ethyl acetate, isopropanol, and mixtures thereof to provide crystalline 3-oxygenated 17,21-dibromo-9(11)-pregnen-20-one, or 3-oxygenated-17,21-dibromo-11β-hydroxy-pregnan-20-one. Conversion of the 3-oxygenated-17,21-dibromo compounds into the final products, i.e. the 3-oxygenated-9(11),16-pregnadien-20-one compounds or the 3-oxygenated 11β-hydroxy-16-pregnen-20-one compounds, is effected by either of two methods. Both methods involve replacement of the 21-bromo substituent with iodine, conversion of the thus formed 21-iodo compound into the corresponding compound wherein the iodo substituent is replaced with hydrogen, and dehydrohalogenation of the resultant product to produce the 3-oxygenated-9(11),16-pregnadien-20-one compounds or the 3-oxygenated-11β-hydroxy-16-pregnen-20-one compounds.

One of the above mentioned methods accomplishes the desired conversion in a single process step wherein it is believed that the individual steps are effected sequentially. Although this is believed to be the probable theoretical explanation of the reaction sequence, we do not wish to be bound by this explanation since in actual practice certain of the reactions may take place simultaneously. In carrying out this conversion, a solution of the 3-oxygenated-17,21-dibromo compound, e.g. the 3-oxygenated-9(11)-pregnen-20-one or the 3-oxygenated-17,21-dibromo-11β-hydroxy-pregnan-20-one is contacted with an alkali metal iodide in at least equimolar amount at a temperature of from about 40–100° C. to form the corresponding 3-oxygenated-9(11),16-pregnadien-20-one or the 3-oxygenated-11β-hydroxy-16-pregnen-20-one compound. The reaction is preferably conducted in an organic solvent solution wherein the solvent is a lower aliphatic ketone or alkanol or mixtures thereof with an aromatic hydrocarbon, e.g. acetone, methanol, or benzene. It is critical that the temperature which is employed be in excess of about 40° C. and preferably between about 45–80° C.

In an alternative method the 3-oxygenated 17,21-dibromo compounds, e.g. the 3-oxygenated 17,21-dibromo-9(11)-pregnen-20-one or the 3-oxygenated-17,21-dibromo-11β-hydroxy-pregnan-20-one dissolved in an organic solvent is contacted with an alkali metal iodide in at least equimolar amount at a temperature of less than about 35° C. and preferably at about 25° to form the corresponding 3-oxygenated-17-bromo-21-iodo-9(11)-pregnen-20-one or the 3-oxygenated-17-bromo-21-iodo-11β-hydroxy-pregnan-20-one compound, treating said 21-iodo compounds without isolation with an aqueous solution of an alkali metal bisulfite to form the corresponding 3-oxygenated-17-bromo-9(11)-pregnen-20-one or the 3-oxygenated-17-bromo-11β-hydroxy-pregnan-20-one. The latter compounds are then contacted with a dehydrohalogenating agent, e.g. a tertiary amine such as pyridine, lithium chloride in an N,N-diloweralkylamide such as dimethyl formamide or dimethyl formamide alone to form the corresponding products; the 3-oxygenated-9(11),16-pregnadien-20-one or the 3-oxygenated-11β-hydroxy-pregnan-20-one compound.

This first step of this alternative procedure is conducted by contacting an organic solvent solution of the steroid for a brief period of time with at least an equimolar amount of an alkali metal iodide. The organic solvent is not critical and may be a lower aliphatic ketone, a lower alkanol or mixtures thereof with an aromatic hydrocarbon, e.g. acetone, methanol, and benzene. Upon completion of the reaction the formed sodium bromide, which arises as a byproduct, may be removed by filtration although it is not necessarily desirable to do so, and the organic solvent is removed by evaporation under vacuum, leaving a residue comprising the above mentioned 3-oxygenated-17-bromo-21-iodo compounds.

In the second step the latter residue is dissolved in water-immiscible organic solvent as for example a lower aliphatic ether or an aromatic hydrocarbon and contacted with an aqueous solution of an alkali metal bisulfite with vigorous agitation thus forming a 3-oxygenated-17-bromo compound, e.g. a 3-oxygenated-17-bromo-9(11)-pregnen-20-one compound or a 3-oxygenated-17-bromo-11β-hydroxy-pregnan-20-one compound dissolved in the organic solvent layer of the 2 phase system. The latter compounds are conveniently recovered by separating the organic layer containing the steroidal product, removing the solvent by evaporation under vacuum, and crystallizing from a lower aliphatic alcohol such as methanol or isopropanol.

In the third step of the above-mentioned alternate method, the latter 3-oxygenated-17-bromo compound is heated in the presence of a dehydrohalogenating agent to form the 3-oxygenated-16,17-unsaturated compounds, e.g. 3-oxygenated-9(11),16-pregnadien-20-one and 3-oxygenated-11β-hydroxy-16-pregnen-20-one compounds.

In a preferred embodiment of the invention 3α-acetoxy-pregnan-20-one is dissolved in chloroform and contacted with a chloroform solution of bromine and a trace of hydrogen bromide in the ratio of approximately 2 moles of bromine to one mole of steroid at a temperature of about 10 to 0° C. to form 3α-acetoxy-17,21-dibromo-11β-hydroxy-pregnan-20-one. When the addition of the solution of bromine is complete the temperature of the reaction mixture is raised to about 40–45° C. and gaseous hydrogen bromide is slowly bubbled through the solution of brominated steroid for a period of approximately one half to one hour to form 3α-acetoxy-17,21-dibromo-9(11)-pregnen-20-one.

The reaction mixture containing the latter compound is washed with aqueous sodium bicarbonate solution and with water to remove the hydrogen bromide present. The chloroform reaction mixture containing the desired compound is then dried and the chloroform removed in vacuo leaving a residue comprising 3α-acetoxy-17,21-dibromo-9(11)-pregnen-20-one which may be crystallized by trituration with ether and further purified if desired by crystallization from isopropyl alcohol. The latter compound is dissolved in acetone and to the acetone solution is added, while maintaining the temperature at 25° C., a weight of sodium iodide approximately equal to the weight of steroid present thereby forming 3-acetoxy-17-bromo-21-iodo-9(11)-pregnen-20-one which remains in solution and sodium bromide which precipitates and is removed by filtration. The acetone filtrate containing the steroid is evaporated under reduced pressure leaving the desired product as a solid residue.

The latter residue is dissolved in ether and shaken with an aqueous solution of 10% aqueous sodium bisulfite solution to form 3α-acetoxy-17-bromo-9(11)-pregnen-20-one dissolved in the ether layer. The ether layer is washed successively with aqueous sodium carbonate solution and water and the ether removed by evaporation under reduced pressure having the desired product as a solid residue which is crystallized from isopropyl alcohol.

The latter product, 3α-acetoxy-17-bromo-9(11)-pregnen-20-one, is dissolved in pyridine and the pyridine solution maintained at reflux temperature for about six hours to form a pyridine solution of 3α-acetoxy-9(11),16-pregnadien-20-one and a precipitate of pyridine hydrobromide which forms as a by-product of the reaction. The product is conveniently recovered by dilution of the reaction mixture with several volumes of water whereupon the pyridine hydrobromide dissolves and the desired product, 3α-acetoxy-9(11),16-pregnadien-20-one separates as crystals which are recovered by filtration.

The following examples are intended to be illustrative of the invention claimed and therefore the invention is not necessarily limited thereto.

EXAMPLE I

17,21-dibromo-3α-acetoxy-9(11)-pregnen-20-one

To a solution of 3.76 grams (0.01 mole) of 3α-acetoxy-11β-hydroxypregnan-20-one in 50 ml. of glacial acid was added 34.5 ml. of 0.578 M bromine in acetic acid (0.02 mole) over a period of one hour at 25°. The resulting solution was stirred for an additional hour and to it was added 280 ml. of water. The mixture was extracted with two 100 ml. portions of chloroform. The chloroform extracts were combined, washed with 100 ml. of water, with 100 ml. of 10% aqueous sodium bicarbonate, and again with 100 ml. of water. The chloroform extract was then dried over magnesium sulfate and concentrated to dryness in vacuo. The residue containing the product was triturated with 10 ml. of acetonitrile to give crystalline product. These crystals were collected by filtration, washed with cold acetonitrile, and dried.

EXAMPLE II

3α-acetoxy-9(11),16-pregnadien-20-one

One gram of the above bromoketone and 1 g. of sodium iodide were dissolved in 25 ml. of acetone. The solution was refluxed 30 minutes, a precipitate of sodium bromide forming and a strong color of iodine developing. The mixture was cooled and filtered. The sodium bromide was washed with acetone and dried, wt. 0.34 g. The acetone filtrate containing the 3α-acetoxy-9(11),16-pregnadien-20-one was evaporated and the residue was taken up in 50 ml. of ether and 25 ml. of 10% aqueous sodium bisulfite solution. On shaking, the iodine color was permanently discharged. The ether layer was washed successively with 25 ml. of 10% sodium bisulfite, 2×25 ml. of 1% sodium carbonate solution, and 25 ml. of water. The ether layer was dried over magnesium sulfate and concentrated to dryness in vacuo, leaving the crystalline product. The product was washed with a few drops of ether and dried; M.P. 142.5–147.5°. Recrystallization from methanol gave M.P. 145.5–149.5° alone or mixed with the product from Example XIB.

EXAMPLE III

17,21-dibromo-3α-acetoxy-9(11)-pregnen-20-one

To a solution of 3.76 g. (0.01 mole) of 3α,11β-dihydroxy pregnan-20-one 3-acetate in 50 ml. of chloroform at 40–45° was added 34.5 ml. of 0.58 M bromine in chloroform (0.02 mole) over a period of an hour, pausing after the introduction of the first few drops until uptake of bromine was established. The solution was cooled to room temperature and washed successively with 100 ml. of 10% aqueous sodium bicarbonate and two 100 ml. portions of water. The chloroform phase was then dried over anhydrous magnesium sulfate and concentrated under reduced pressure to a syrup. On trituration with 10 ml. of acetonitrile the syrup crystallized. After cooling, the crystals of 17,21-dibromo-3α-acetoxy-9(11)-pregnen-20-one were collected, washed with a minimal quantity of cold acetonitrile and dried; weight, 3.15 g.; M.P. 143–147°. A sample recrystallized twice further from methanol melted at 145–147°.

Analysis.—Calcd. for $C_{23}H_{32}O_3Br_2$: C, 53.50; H, 6.25; Br, 30.96. Found: C, 54.19, H, 6.60, Br. 30.72.

EXAMPLE IV

17-bromo-3α-acetoxy-9(11)-pregnen-20-one

The acetonitrile mother liquor and washings containing 17,21-dibromo-3α-acetoxy-9(11)-pregnen-20-one described in Example III were combined and evaporated leaving a residue comprising the dibromo pregnene. This was dissolved in 42.4 ml. of acetone and 1.695 g. of sodium iodide was added. The solution was heated at reflux for two hours to produce 17-bromo-21-iodo-3α-acetoxypregnen-20-one, depositing a precipitate of sodium bromide and developing an iodine color. The suspension was filtered from the sodium bromide, the combined filtrate and washes were evaporated, and the residue was taken up in 50 ml. of ether and 25 ml. of 10% aqueous sodium bisulfite solution. The two phases were shaken together until the iodine color no longer returned to the ether phase. The ether phase was then successively washed with 25 ml. more of 10% bisulfite solution, two 25 ml. portions of 1% aqueous sodium carbonate solution, and two 25 ml. portions of water. The ether solution was then evaporated to dryness, leaving a solid residue comprising 17-bromo-3-acetoxy-9(11)pregnen-20-one, M.P. 147–160° C. After three crystallizations from methanol, the product melted at 182–184.3°

Analysis.—Calcd. for $C_{23}H_{33}O_3Br$: C, 63.15; H, 7.60; Br, 18.27. Found: C, 63.16; H, 7.81; Br. 17.80.

EXAMPLE V

17,21-dibromo-3α-acetoxy-9(11)-pregnen-20-one

To a solution of 7.52 g. (0.02 mole) of 3α-acetoxy-11β-hydroxy-pregnan-20-one in 100 ml. of chloroform at −10° to 0° was added 63.5 ml. of 0.576 M bromine in chloroform (0.0366 mole) over a period of an hour, after first initiating uptake of bromine by bubbling a trace amount of gaseous hydrogen bromide into the solution, to form 17,21-dibromo-3α-acetoxy-11β-hydroxypregnan-20-one. At the end of the addition, the temperature of the batch was raised to 40–45° and held there for an hour while a stream of gaseous hydrogen bromide was slowly bubbled through. During this treatment the solution became turbid due to formation of water. The batch was cooled to room temperature and shaken with 100 ml. of 10% sodium bicarbonate solution. The chloroform phase was washed with two 100 ml. portions of water, dried over magnesium sulfate, and taken to a syrup under reduced pressure. On trituration with ether, the syrup gave crystals of 17,21-dibromo-3α-acetoxy-9(11)-pregnen-20-one which were washed with four 10 ml. portions of ether and dried; M.P. 143.5–146°. The ether washings gave a residue which after two successive crystallizations each from 10 ml. of isopropyl alcohol yielded additional 17,21-dibromo-3α-acetoxy-9(11)-pregnen-20-one, (M.P. 141–144.5°).

EXAMPLE VA

17,21-dibromo-3α-acetoxy-9(11)-pregnen-20-one and 17,21-dibromo-3α-acetoxy-11β-hydroxypregnan-20-one The bromination was conducted substantially as described in Example III, except on twice the scale. The crude product from acetonitrile melted at 137–145° with bubbling. The product was largely the 9(11) derivative, but the bubbling indicated the presence of a trace impurity. Three grams of the material were recrystallized successively from 75, 100, and 50 ml. of methanol to give a small amount of 17,21-dibromo-3α-acetoxy-11β-hydroxy-pregnan-20-one (as the methanol solvate), M.P. 160–161.5° (bubbling). An analytical specimen, M.P. 161.5–164.5°, was prepared by recrystallizing once more from methanol.

Analysis.—Calcd. for $C_{23}H_{34}O_4Br_2CH_4O$: C, 50.89; H, 6.76; Br, 28.22. Found: C, 50.61; H, 6.41; Br, 28.33.

EXAMPLE VI

17,21-dibromo-3α-acetoxy-9(11)-pregnen-20-one

Through a solution of 0.5 g. of 17,21-dibromo-3α-acetoxy-11β-hydroxypregnan-20-one in 75 ml. of chloroform at 40–45° was slowly bubbled gaseous hydrogen bromide to form the above identified product. The batch was cooled to room temperature and shaken with 150 ml. of 10% sodium bicarbonate solution. The chloroform phase was washed with two 100 ml. portions of water, dried over magnesium sulfate, and concentrated under reduced pressure to a syrup. On trituration with methanol, crystals of 17,21-dibromo-3α-acetoxy-9(11)-pregnan-20-one were obtained. After washing with cold methanol and recrystallization from methanol, the material melted at 142.5–145° and the melting point of a mixture with the material prepared in Example III was not depressed.

EXAMPLE VII

*17,21-dibromo-3α-hydroxy-9(11)-pregnen-20-one*

To a solution of 3.34 g. (0.01 mole) of 3α,11β-dihydroxy-pregnan-20-one in 100 ml. of chloroform at 40–45° was added 34.5 ml. of 0.58 M bromine in chloroform (0.02 mole) over a period of one hour, pausing after the introduction of the first few drops until uptake of bromine was established. The solution was cooled to room temperature and washed successively with 100 ml. of 10% aqueous sodium bicarbonate and two 50-ml. portions of water. The chloroform phase was then dried over anhydrous magnesium sulfate and concentrated under reduced pressure to a syrup. On dissolution in 10 ml. of acetonitrile and standing several hours at room temperature the syrup yielded crystals of 17,21-dibromo-3α-hydroxy-9(11)-pregnen-20-one. After chilling in ice, the suspension of crystals was filtered and the crystals were washed with a minimal quantity of cold acetonitrile. After drying, the material melted at 143.6–148° (dec.).

EXAMPLE VIII

*3α-hydroxy-9(11),16-pregnadien-20-one*

To a solution of one gram of 17,21-dibromo-3α-hydroxy-9(11)-pregnen-20-one in 25 ml. of acetone was added 1 g. of sodium iodide. The solution was heated at the reflux temperature for two hours, during which time sodium bromide precipitated and an iodine color developed. The suspension was cooled to room temperature and filtered, and the sodium bromide was washed with acetone and dried. The sodium bromide weighed 0.30 g., corresponding to elimination of 69% of the bromide originally present. The acetone filtrate plus washes were evaporated to dryness and the residue was taken up in 50 ml. of ether and 25 ml. of 10% aqueous sodium bisulfite solution. The mixture was shaken, the iodine color being immediately discharged. The iodine color failed to return, indicating that reductive elimination of halogen from position 21 had been complete before treatment with bisulfite. The ether phase was washed further with 25 ml. of 10% bisulfite, two 25 ml. portions of 1% sodium carbonate solution and two 25 ml. portions of water. The ether solution was dried over magnesium sulfate and evaporated to dryness leaving a solid residue. Its ultraviolet absorption spectrum $$(\lambda_{max.}^{methanol} = 238\ m\mu,\ A\%,\ 119)$$

indicated it to be approximately one-half 3α-hydroxy-9(11),16-pregnadien-20-one, the balance being 17-bromo-3α-hydroxy-9(11)-pregnen-20-one. Without separation, the mixture was dissolved in 10 ml. of pyridine and heated at the reflux temperature for six hours. The solution was cooled to room temperature and slowly diluted with 50 ml. of water, yielding a suspension of crystals. After chilling, the suspension was filtered and the crystals were washed with water and dried. The crude 3α-hydroxy-9(11),16-pregnadien-20-one melted at 177–183°. After recrystallization from 4 ml. of ethyl acetate, the material melted at 180–185°.

EXAMPLE IX

*3α-acetoxy-9(11),16-pregnadien-20-one*

A solution of 100 mg. of 3α-hydroxy-9(11),16-pregnadien-20-one in a mixture of 0.5 ml. of pyridine and 0.5 ml. of acetic anhydride was heated on the steam bath for one hour. The solution was cooled to room temperature and diluted with 5 ml. of water, giving a suspension of crystals of 3α-acetoxy-9(11),16-pregnadiene-20-one. These were collected, washed with water, and dried, M.P. 146–149°. The melting point was not depressed on admixture with an analytically pure specimen of 3α-acetoxy-9(11),16-pregnadiene-20-one.

EXAMPLE X

*17-bromo-3α-acetoxy-9(11)-pregnen-20-one*

To a solution of 30.1 g. (0.08 mole) of pregnane-3α,11β-diol-20-one 3-acetate in 400 ml. of chloroform at 0–5° was added 78 ml. of 1.88 M bromine in chloroform (0.147 mole) over a period of an hour, pausing after the introduction of the first few drops until uptake of bromine was established. The solution was heated to 40–45° and gaseous hydrogen bromide was slowly bubbled through over a period of one-half hour. The resulting turbid solution was cooled to room temperature and was washed successively with 300 ml. of 10% sodium bicarbonate solution and two 200 ml. portions of water. The chloroform phase was concentrated to dryness under reduced pressure to give a residue which crystallized on trituration with ether. This entire crude 17,21-dibromo-3α-acetoxy-9(11)-pregnen-20-one was dissolved in 400 ml. of acetone and 40 g. of sodium iodide was added, dissolving.

The resulting solution was stored at room temperature for 10 minutes, during which time a heavy precipitate of sodium bromide formed. The mixture was then subjected to reduced pressure to remove the acetone maintaining the internal temperatures below 30°. The residue, whose organic component was now largely 21-iodo-17-bromo-3α-acetoxy-9(11)-pregnen-20-one, was taken up in 500 ml. of 10% aqueous sodium bisulfite solution and 500 ml. of ether. The phases were intermittently shaken until the iodine color failed to return. The ether phase was washed with two 400 ml. portions of 2% sodium carbonate solution and two 400 ml. portions of water. It was dried over magnesium sulfate and taken to dryness under reduced pressure. The residue was slurried in 66 ml. of boiling isopropyl alcohol and the slurry was chilled to 0° and filtered. The crystals were washed with 50 ml. of cold isopropyl alcohol and dried, yielding 28.465 g. of 17-bromo-3α-acetoxy-9(11)-pregnen-20-one, M.P. 178–184.5°.

EXAMPLE XB

*3α-acetoxy-9(11),16-pregnadien-20-one*

A solution of 28.45 g. of 17-bromo-3α-acetoxy-9(11)-pregnen-20-one in 85 ml. of pyridine was heated at the reflux temperature with agitation for six hours, during which time pyridine hydrobromide precipitated. The mixture was cooled to room temperature and diluted slowly with 425 ml. of water. During the addition of water the pyridine hydrobromide rapidly dissolved and the 3α-acetoxy-9(11),16-pregnadien-20-one soon crystallized. The resulting suspension was chilled in ice and filtered. The crystals were washed with water and dried, M.P. 143.5–148°. The material showed $$\lambda_{max.}^{methanol} = 238\ m\mu,\ A\% = 218$$

EXAMPLE XIA

*17-bromo-3α-acetoxy-9(11)-pregnen-20-one*

To a solution of 3.76 g. (10 mM) of 3α-acetoxy-11β-hydroxypregnan-20-one in 50 ml. of glacial acetic acid was added 18.6 ml. of 0.578 M bromine in acetic acid (10.8 mM) over a period of an hour at 26°. The resulting solution was stirred for an additional hour and to it was added 2 g. of sodium acetate, followed by 280 ml. of water. The mixture was extracted with two 100-ml. portions of chloroform. The chloroform extracts were combined, washed with 100 ml. of water, with 100 ml. of 10% aqueous sodium bicarbonate, and with 100 ml. of water. The chloroform solution was dried over magnesium sulfate and concentrated to dryness in vacuo. Trituration of the residue with 20 ml. of methanol gave crystals of 17-bromo-3-acetoxy-9(11)-pregnen-20-one which were collected, washed with cold methanol and dried. The dried crystalline product was recrystallized from 13 ml. of acetonitrile to give 17-bromo-2-acetoxy-9(11)-pregnen-20-one.

EXAMPLE XIB

*3α-acetoxy-9(11),16-pregnadien-20-one*

One gram of the above recrystallized bromoketone, and 0.25 g. of lithium chloride were dissolved in 5 ml. of dimethylformamide and the solution was heated 16 hours at 95°. The solution was cooled and diluted with 10 ml. of water. The resulting precipitate was extracted into ether and the ether solution was washed with aqueous sodium bicarbonate solution and water. The ether solution was dried over magnesium sulfate and taken to a very small volume, giving a suspension of the product. The crystals of product were collected, washed with a few drops of ether and dried . . . M.P. 143.5–147°. Recrystallization from methanol gave a specimen (plates) melting at 148–150°;

$$\lambda_{max.}^{methanol} = 237\ m\mu,\ A\%\ 242$$

*Analysis.*—Calcd. for $C_{23}H_{32}O_3$: C, 77.49; H, 9.05. Found: C, 77.68; H, 8.98.

EXAMPLE XII

*17,21-dibromo-3α-acetoxy-11β-hydroxypregnan-20-one*

To a solution of 7.52 (0.02 mole) of 3α-acetoxy-11β-hydroxy-pregnan-20-one in 100 ml. of chloroform at −25° to −7° was added 70 ml. of 0.572 M bromine in chloroform (0.04 mole) over a period of two hours, after first initiating uptake of bromine by bubbling a trace amount of gaseous hydrogen bromide into the solution. To the cold solution was added 100 ml. of 10% aqueous sodium bicarbonate solution and the phases were mixed. The chloroform phase containing the product was separated and washed with two 100 ml. portions of water and dried over magnesium sulfate. The solution was evaporated to dryness under reduced pressure and the residue crystallized upon trituration with ether. The crystals of 17,21-dibromo-3α-acetoxy-11β-hydroxy-pregnan-20-one were washed onto a funnel with 25 ml. of cold methanol and dried.

EXAMPLE XIII

*17,21-dibromo-3α-acetoxy-11β-hydroxypregnan-20-one*

To a solution of 7.52 g. (0.02 mole) of 3α-acetoxy-11β-hydroxy-pregnan-20-one in a mixture of 40 ml. of chloroform and 10 ml. of methanol at 40–45° was added 68.7 ml. of 0.583 M bromine in chloroform (0.04 mole) over a period of forty-seven minutes. The solution was cooled to room temperature and washed successively with 100 ml. of 10% sodium bicarbonate solution and two 100-ml. portions of water. After drying over magnesium sulfate the solution was concentrated under reduced pressure. Trituration of the residue with cold acetonitrile gave crystals which were collected, washed with a minimal quantity of acetonitrile and dried. It weighed 3.47 g. Three grams were recrystallized from 100 ml. of methanol to give 17,21-dibromo-3α-acetoxy-11β-hydroxy-pregnan-20-one, M.P. 168–169° (dec.). Its infrared spectrum was identical with that of the sample prepared as described in Example VA.

EXAMPLE XIV

*17-bromo-3α-acetoxy-11β-hydroxypregnan-20-one*

To a solution of 4.95 g. of 17,21-dibromo-3α-acetoxy-11β-hydroxypregnan-20-one in 100 ml. of hot acetone was added 5 g. of sodium iodide to form 17-bromo-21-iodo-3α-acetoxy-11β-hydroxypregnan-20-one. The solution was immediately cooled to room temperature and stored for one-half hour, during which time a precipitate of sodium bromide appeared. The suspension was filtered and the sodium bromide washed with acetone and dried. The sodium bromide weighed 0.88 g. and corresponds to the replacement of approximately one-half of the bromine originally present. The acetone filtrate containing the product plus washes were evaporated to dryness and the residue was taken up in 50 ml. of ether and 50 ml. of 10% aqueous sodium bisulfite. The phases were intermittently shaken until the iodine color failed to reappear in the ether layer. The ether layer was washed with two 50 ml. portions of 2% aqueous sodium carbonate solution and with 50 ml. of water. The ether solution was evaporated to dryness under reduced pressure leaving a crystalline residue of 17-bromo-3α-acetoxy-11β-hydroxypregnan-20-one. This was recrystallized from 40-ml. of methanol; M.P. 146–156° (dec.).

EXAMPLE XV

*3α-acetoxy-11β-hydroxy-16-pregnen-20-one*

A solution of 1 g. of 17-bromo-3α-acetoxy-11β-hydroxypregnan-20-one in 10 ml. of pyridine was refluxed for six hours. The solution was cooled to room temperature and diluted slowly with 50 ml. of water, yielding a suspension of crystals. The crystals were collected, washed with water and dried. This crude 3α-acetoxy-11β-hydroxy-16-pregnen-20-one melted at 120–133°. While direct recrystallization from methanol afforded material melting at 143–153°, chromatography of 0.5 g. on 15 g. of acid-washed alumina gave in the 4:1 benzene:chloroform eluate 0.22 g. of material which on further recrystallization melted at 158.5–160°. An analytical specimen of this compound was obtained from methanol as cottony needles, melting at 160.5–161.5° and showing $$\lambda_{max.}^{methanol} = 239\ m\mu,\ A\% = 244$$

*Analysis.*—Calcd. for $C_{23}H_{32}O_4$: C, 73.76; H, 9.15. Found: C, 73.51; H, 9.30.

As shown in the preceding examples, either the 3-hydroxy compound or the 3-acetoxy compound may be brominated directly. It is a convenient procedure to brominate the 3-hydroxy compounds in acetic acid, thereby effecting acetylation of the 3-hydroxy group as well as brominating the steroid.

We claim:
1. 3α-hydrocarbonacyloxy-17α-bromo-9,(11)-pregnen-20-one.
2. 3α-hydrocarbonacyloxy-17α,21-dibromo-9(11)-pregnen-20-one.
3. 3α-hydroxy-17α,21-dibromo-9,(11)-pregnen-20-one.
4. 3α-acetoxy-17α-bromo-9(11)-pregnen-20-one.
5. 3α-acetoxy-17α,21-dibromo-9(11)-pregnen-20-one.
6. 3α-acetoxy-17α,21-dibromo-11β-hydroxypregnan-20-one.

References Cited in the file of this patent

UNITED STATES PATENTS

| | | |
|---|---|---|
| 2,656,364 | Hershberg | Oct. 20, 1953 |
| 2,752,341 | Magerlein | June 26, 1956 |

OTHER REFERENCES

Callow et al.: "Journal of Chemical Society" (1956), pages 4739–43 relied on.